United States Patent

[11] 3,565,037

[72] Inventor Walter W. Walling
 Houston, Tex.
[21] Appl. No. 836,688
[22] Filed June 9, 1969
[45] Patented Feb. 23, 1971
[73] Assignee Schlumberger Technology Corporation
 New York, N.Y.

[54] COATING APPARATUS
 12 Claims, 6 Drawing Figs.
[52] U.S. Cl. .................................................. 118/425,
 134/157, 269/58
[51] Int. Cl. ............................................... B05c 3/02
[50] Field of Search ........................................ 118/425,
 52, 53, 30, 54, 55, 56, 500, 503; 117/113, 115,
 (Inquired); 68/(Inquired); 269/58; 214/1 (R);
 134/157 (R), 157

[56] References Cited
 UNITED STATES PATENTS
 1,943,454 1/1934 Paridon ....................... 118/425

| 2,163,276 | | Fritzsche et al. ............... | 134/157 |
| 2,986,114 | 5/1961 | Fuchs et al. ..................... | 118/425X |
| 3,459,313 | 8/1969 | Upton et al. .................... | 134/157X |

Primary Examiner—Morris Kaplan
Attorneys—Ernest R. Archambeau, Jr., William J. Beard, David L. Moseley, Edward M. Roney, William R. Sherman and Stewart F. Moore ABSTRACT: The invention disclosed herein is directed to new and improved apparatus for uniformly coating heated articles in a liquid bath or a fluidized bed of a fluent coating material. In each of the several disclosed embodiments, first and second pairs of rotatively driven rollers are spaced along selected parallel axes and adapted for selectively rotating an assemblage including one or more articles to be coated about a third parallel axis which, preferably, is a major axis of symmetry of the articles. After being heated, the assemblage is disposed on the apparatus and rotated as the apparatus at least partially immerses the rotating articles into the coating composition for a sufficient period of time to uniformly coat their exposed surfaces.

3,565,037

Walter W. Walling
INVENTOR

BY *E.R. Archambeau Jr.*
ATTORNEY

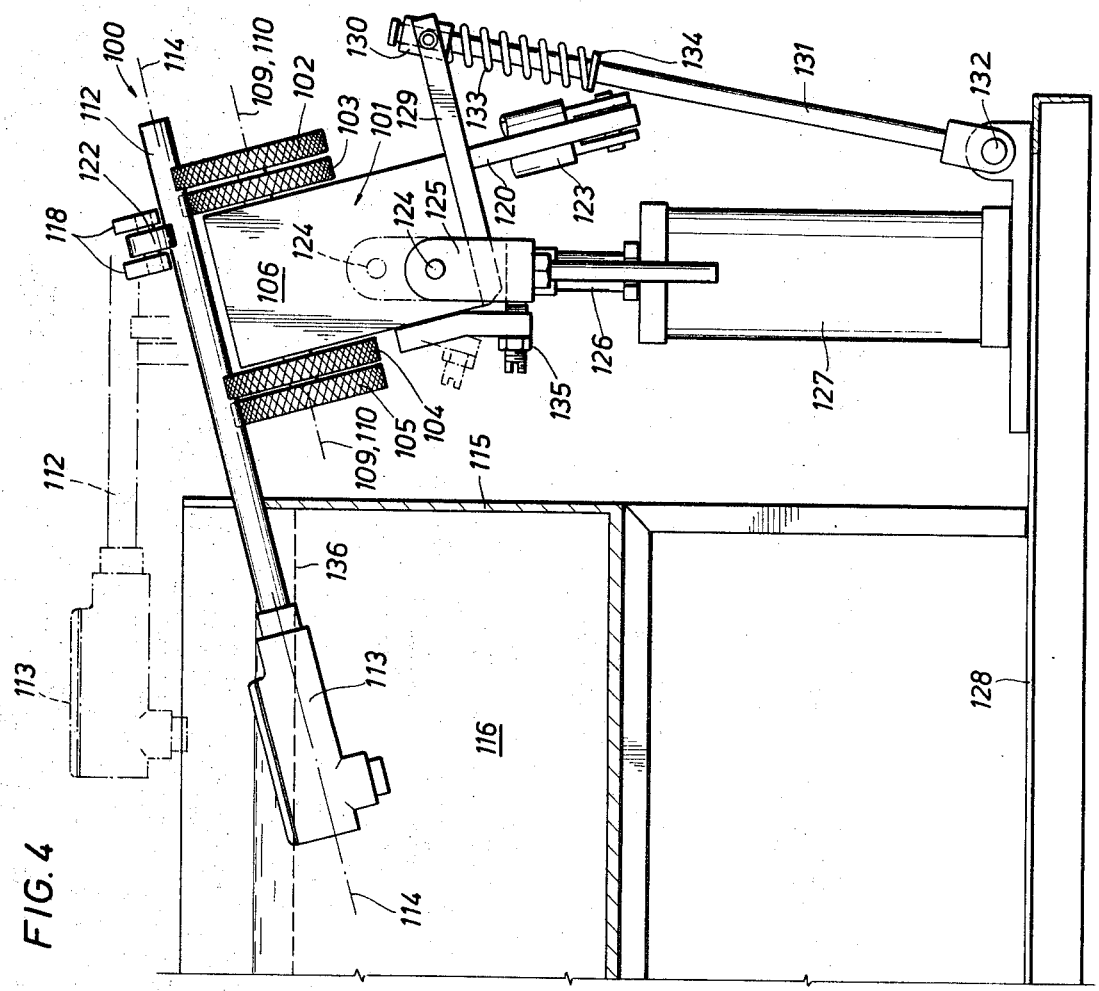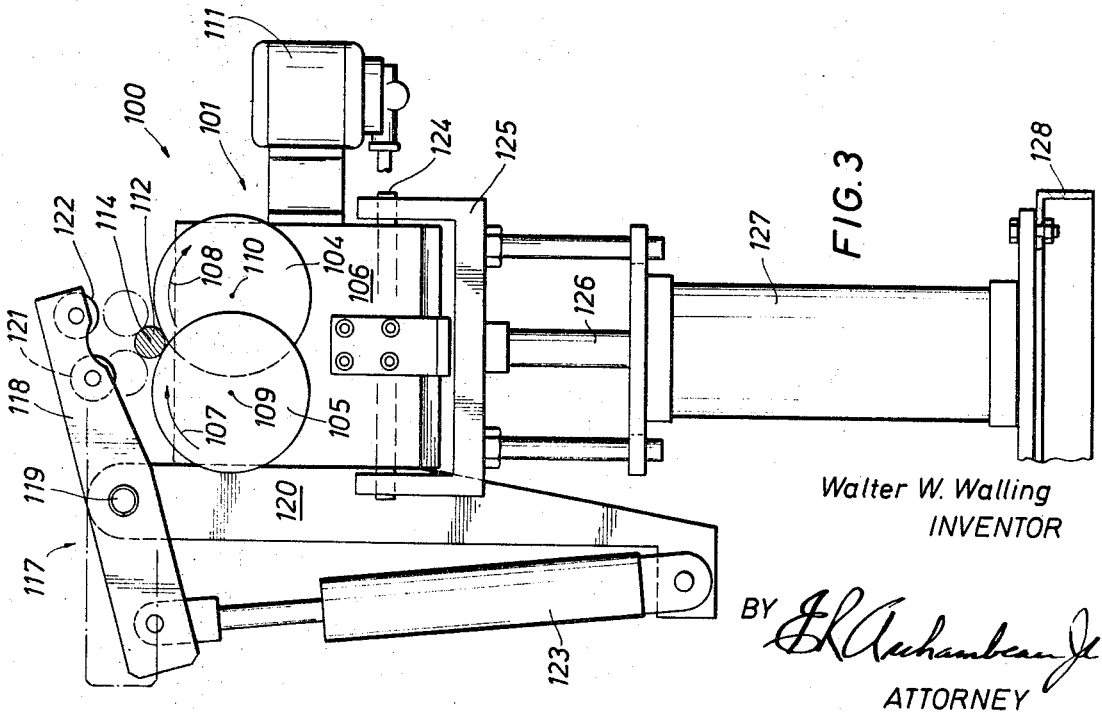

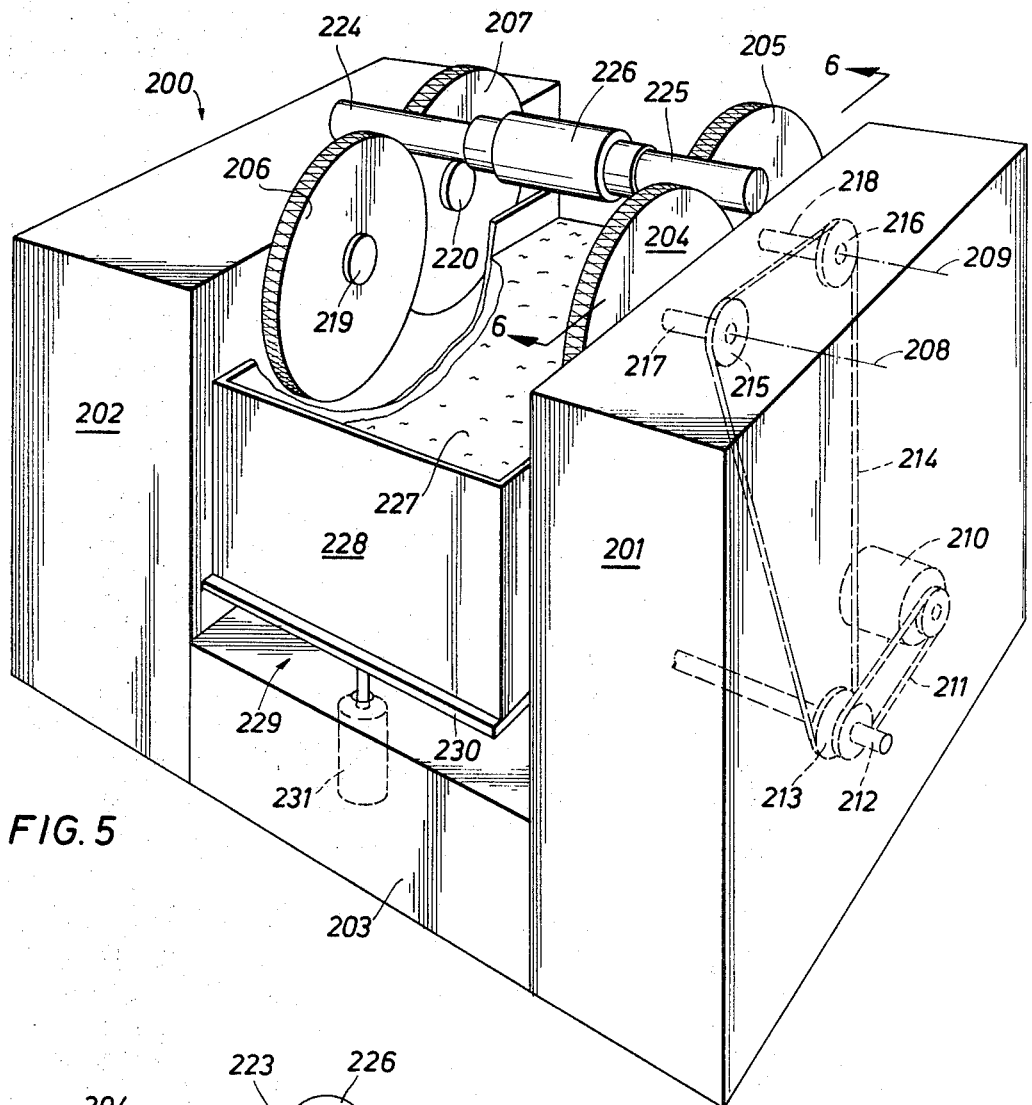
FIG. 5
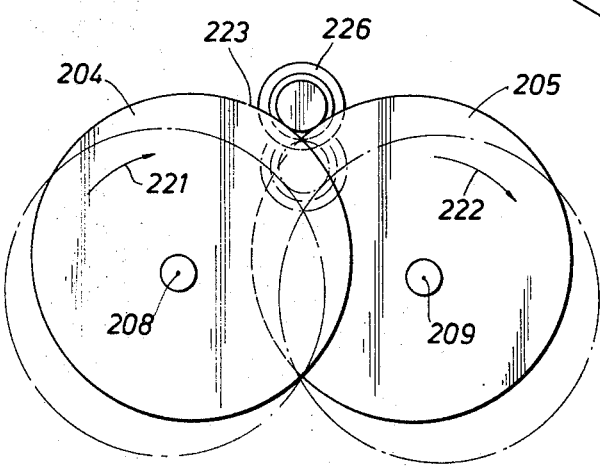
FIG. 6
Walter W. Walling
INVENTOR
BY 
ATTORNEY

COATING APPARATUS

It is, of course, quite common to coat metal articles by heating the articles to an elevated temperature and then immersing the heated articles into either a liquid bath or a fluidized bed of a selected coating composition having a sintering temperature lower than the temperature of the articles. As the heated articles are brought into contact with the coating composition, the coating composition absorbs heat from the articles and is melted to form a continuous fused coating on the substrate surfaces. Where the nature of the coating composition so requires, the freshly coated articles are subsequently reheated to complete the fusion process and leave an effective protective coating on the substrate surfaces.

Irrespective of the particular coating composition being used, it is generally recognized that the heated articles must usually be agitated while they are immersed in the coating composition in order to assure uniformly distributed coatings. It will be appreciated, therefore, that the fixtures employed to support such articles must be capable of reliably securing the articles so that they will not be lost in the coating bath or bed as they are being agitated. On the other hand, although such fixtures must be firmly coupled to the articles, these fixtures cannot cover or even be closely adjacent to the exposed surfaces that are to be coated. These requirements, of course, pose no particular problem where only small quantities are involved. The problem becomes more significant, however, when large-scale coating operations are considered for a competitive market and, particularly so, if the articles being coated are relatively small. For example, where typical electrical conduit fittings are being coated in large quantities, a significant labor expense is involved merely in mounting and dismounting the fittings on whatever fixtures are used for transporting the fittings through the coating plant. Moreover, unless special handling techniques are used, it is impractical to coat different sizes and/or styles of such articles during a given production cycle.

Other problems also arise in such large-scale coating operations. For instance, where the coating material is a pulverulent composition that is employed in a typical fluidized bed, it is usually preferable to move the articles being coated into and out of the fluidized bed several times to obtain a uniform coating of sufficient thickness. Similarly, where the coating composition is a liquid, the articles must be moved into and out of the liquid bath at least once and must also be carefully manipulated in such a manner that the freshly applied coating will neither run nor drip as the freshly coated article is being removed.

Accordingly, it is an object of the present invention to provide new and improved coating apparatus that is particularly suited for efficiently coating large numbers of symmetrically formed articles in such a manner that a uniform coating will be reliably deposited on each article.

This and other objects of the present invention are attained by arranging first and second pairs of similar upright rollers in such a manner that one roller of each pair is adapted for rotation about a first generally horizontal axis and the other roller of each pair is adapted for rotation about a generally horizontal axis laterally adjacent to and paralleling the first axis. The lateral spacing between these first and second axes as well as the size of the rollers are appropriately arranged so that the upper surfaces of the rollers will tangentially contact opposite sides of a cylindrical shaft or axle laid thereacross for rotating one or more previously heated articles mounted along the shaft about a third parallel axis slightly above and between the first and second axes. Selectively operable means are further provided for lowering the apparatus so as to at least partially immerse the perimeter of the rotating articles into a coating composition therebelow.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 3 is an elevational view of the front of a second embodiment of the present invention;

FIG. 4 is an elevational side view of the new and improved apparatus illustrated in FIG. 3 and depicts the apparatus in a different operating position;

FIG. 5 shows still another embodiment of the present invention;

FIG. 6 is an enlarged detail view of a portion of the apparatus shown in FIG. 5.

Figure 1:
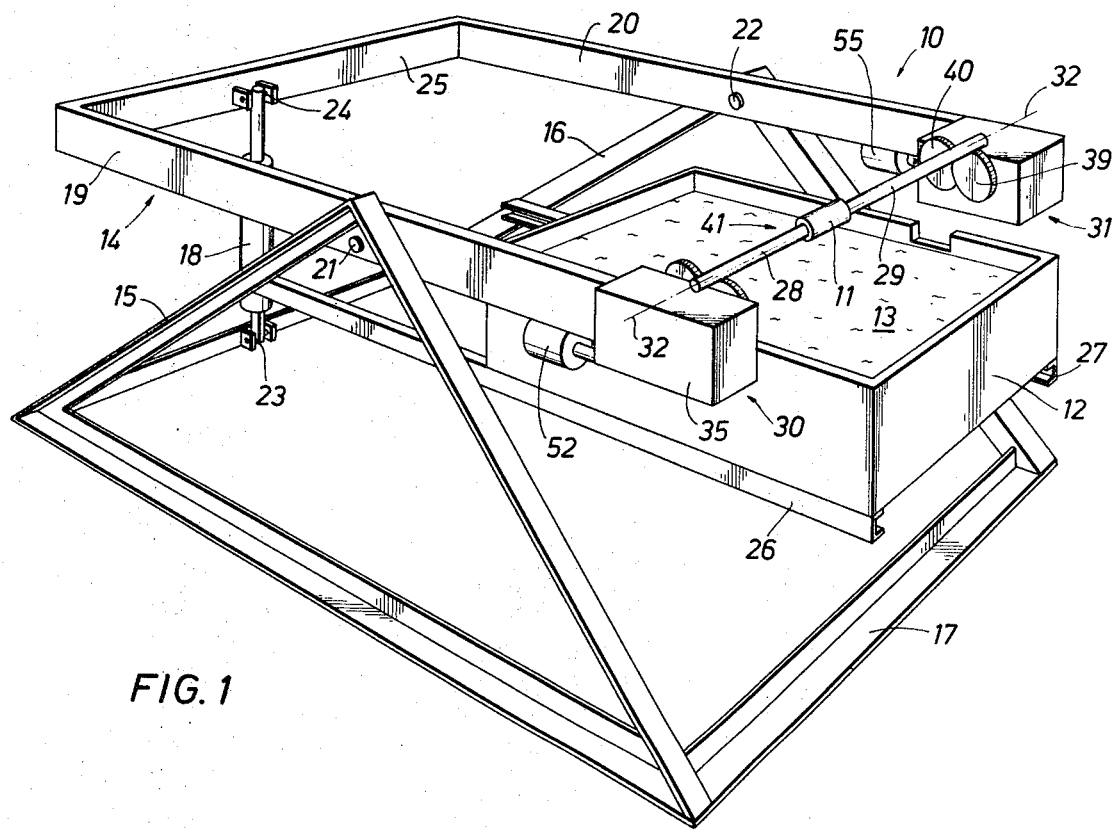
FIG. 1 is an isometric view of one embodiment of apparatus arranged in accordance with the principles of the present invention.

Turning now to FIG. 1, the new and improved coating apparatus 10 depicted there is particularly adapted for coating small articles that are substantially symmetrically formed about a major axis and have coincidentally aligned connection means on opposite ends thereof. Accordingly, as illustrated, the coating apparatus 10 is operatively supporting a typical electrical conduit fitting, such as a tee or a threaded coupling 11, above a container 12 of a suitable liquid or fluidized coating composition 13. In this embodiment of the present invention, the coating apparatus 10 includes a generally horizontal, U-shaped frame 14 that is operatively journaled between a pair of laterally spaced uprights 15 and 16 on a suitable base 17 so that the frame is pivotable about a horizontal axis through a limited arc of travel. Selectively operable actuating means, such as a typical vertically reciprocating piston actuator 18 coupled between the supporting base 17 and the rear of the frame 14, are operatively arranged for selectively tilting the forward end of the frame upwardly and downwardly above the container 12 between the elevated position illustrated and slightly lower predetermined position therebelow.

In this illustrated arrangement of the coating apparatus 10, the frame 14 has a pair of elongated side rails 19 and 20 that are laterally spaced from one another and respectively journaled at convenient intermediate locations thereon, as at 21 and 22, between the upper ends of the triangularly shaped uprights 15 and 16. The lower end of the reciprocating piston actuator 18 is movably coupled, as at 23, to the rear of the base 17 and the upper end of the piston actuator is movably coupled, as at 24, to a transverse member 25 interconnecting the rearward ends of the two side rails 19 and 20. To support the coating material container 12, a pair of horizontal supports 26 and 27 are secured between the upright base members 15 and 16 and extended forwardly a sufficient distance to position the container below and slightly ahead of the forward ends of the side rails 19 and 20 of the frame 14.

Figure 2:
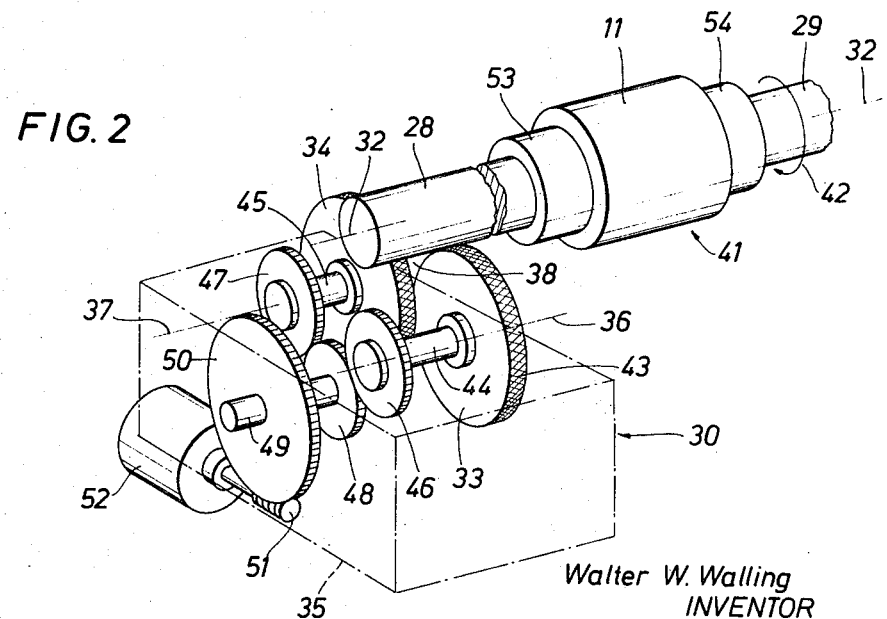
FIG. 2 is an enlarged, somewhat schematic, view of a portion of the apparatus depicted in FIG. 1.

As seen in FIG. 1, cylindrical shafts 28 and 29 are respectively coupled to the opposite ends of the conduit coupling 11; and the outer ends of these coincidentally aligned shafts are supported between oppositely facing, similar driving mechanisms 30 and 31 that are respectively mounted on the forward ends of the side rails 19 and 20 and adapted for selectively rotating the shafts and coupling at a predetermined speed about a selected generally horizontal axis 32. As shown schematically in FIG. 2, in the preferred arrangement of these driving mechanisms 30 and 31, a matched pair of upright rollers or driving wheels 33 and 34 are respectively mounted exterior of a suitable enclosure 35 and adapted for rotation about paralleled horizontal axes 36 and 37. As depicted, one of the driving wheels is slightly advanced ahead of the other; and the driving wheels 33 and 34 are appropriately sized in relation to the lateral spacing of the parallel axes 36 and 37 so as to partially overlap one another and define therebetween an upwardly facing, generally divergent notch as at 38. Accordingly, as shown in FIGS. 1 and 2, the outer ends of the axles are supported within these notches (as at 38) and frictionally engaged with the driving wheels 33 and 34 (as well as 39 and 40) so that, upon rotation of the driving wheels in the same direction, the assemblage 41 including the supporting axles 28 and 29 and the coupling 11 mounted thereon will be rotatively driven in the direction shown by the arrow 42. To enhance the frictional contact between the cylindrical shafts 28 and 29, and the driving wheels 33 and 34 (as well as the wheels 39 and 40 of the other driving mechanism 31), the peripheries of the driving wheels are either specially coated or knurled, as at 43.

To rotate the driving wheels 33 and 34 in the same rotative direction, a suitable gearing arrangement or to other speed-reduction device is employed to establish a desired rotative speed for the driving wheels and the assemblage 41. Thus, as shown in FIG. 2, the circular driving wheels 33 and 34 are concentrically mounted on short shafts 44 and 45 operatively journaled within the enclosure 35 and carrying on their inner ends identical pinion gears 46 and 47 that are respectively engaged with a common driving gear 48. The driving gear 48 is, in turn, mounted on another shaft 49 that is journaled within the enclosure 35 and carries a worm gear 50 operatively coengaged with a worm screw 51 driven by an electric motor 52. It will be appreciated, of course, that the various gears 46—48, 50 and 51 can be selected so as to obtain a desired rotational speed of the driving wheels 33 and 34 at a given speed of the motor 52. To provide a greater range of operating speeds, the motor 52 can, of course, be a typical variable speed motor. Suitable manual, semiautomatic or fully automatic controls (not shown) can, of course, be arranged to control the sequential operations of the piston actuator 18 and the driving mechanisms 30 and 31.

It will be appreciated that all conduit fittings do not have threaded openings that are in coincidental alignment with one another so as to permit them to be mounted on coincidentally aligned axles or shafts as at 28 and 29. For example, various styles of electrical conduit elbows have an elongated body with a first threaded opening at one end thereof that is coaxially formed about the major axis of symmetry of the body and a second threaded opening on one side or the other thereof and near the other end of the body which is coaxially formed about a second axis perpendicular to the major axis. Thus, it will be appreciated that a fitting of this nature could not be readily coated by means of the coating apparatus 10.

Accordingly, to accommodate the various styles of conduit fittings having only a single threaded opening that is coincidentally aligned with the major axis of symmetry of the fitting, coating apparatus 100 such as shown in FIGS. 3 and 4 is arranged in accordance with the principles of the present invention. As depicted in FIGS. 3 and 4, the coating apparatus 100 includes a single driving mechanism 101 that is generally similar to those shown in FIGS. 1 and 2 but instead has first and second pairs of aligned driving wheels 102—105 mounted on the forward and rearward ends of a suitable support or enclosure 106 and adapted to be rotated in the same rotative direction (as shown by the arrows 107 and 108 in FIG. 3) about first and second generally horizontal, parallel axes 109 and 110. It will be appreciated, of course, that the driving mechanism 101 includes a suitable speed-reduction mechanism (not shown) such as those employed with the coating apparatus 10 that is operatively arranged within the enclosure 106 for simultaneously rotating the driving wheels 102—105 at a greatly reduced speed in relation to the rotative speed of a typical motor 111 mounted on the enclosure and operatively coupled to the speed-reduction mechanism therein. Here again if desired, the motor 111 may be a variable speed electric motor.

As best illustrated in FIG. 4, the driving wheels 102—105 are arranged to carry the rearward portion of an elongated axle or shaft 112 having a conduit fitting, as at 113, mounted on the forward end of the cylindrical shaft with its major axis of symmetry being coincidentally aligned with the longitudinal axis 114 of the shaft. It will be appreciated, therefore, that by placing the rearward portion of the shaft 112 across the driving wheels 102—105 so as to position the conduit fitting 113 on the forward end thereof above a suitable container 115 of a liquid or fluidized coating material 116, rotation of the shaft will be effective to rotate the conduit fitting about its major axis of symmetry 114 in the same manner as previously described with respect to the coating apparatus 10.

To retain the axle 112 on the driving wheels 102—105 as they are being driven, selectively operable clamping means 117 are provided and include a transversely positioned arm 118 that is pivotally supported, as at 119, at about its midpoint to an upright support 120 secured along one side of the enclosure 106 and adapted for vertical movement above the rearward portion of the axle. The forward end of the pivotally mounted arm 118 carries a pair of longitudinally spaced rollers 121 and 122 on its lower side that are adapted to be lowered into rolling engagement with circumferentially spaced points on the rearward portion of the shaft 112 as it is lying across the driving wheels 102—105 so as to maintain the shaft frictionally engaged and firmly positioned across the driving wheels. To raise and lower the idler rollers 121 and 122, actuating means, such as a reciprocating piston actuator 123 coupled between the enclosure 106 and the rearward end of the pivotal arm 118, are operatively arranged for selectively lowering and elevating the forward end of the pivotal arm between the full-line and dashed-line positions illustrated in FIG. 3.

To at least partially immerse the conduit fitting 113 into the coating composition 116, the coating apparatus 100 is arranged in such a manner that the driving mechanism 101 can be selectively moved between its erect position depicted in FIG. 3 and the forwardly tilted position illustrated in FIG. 4. In the preferred manner of accomplishing this tilting movement, the driving mechanism 101 is mounted on a transverse, generally horizontal shaft 124 that is journaled at its opposite ends between the laterally spaced upright arms of a bifurcated bracket 125 that is, in turn, mounted on the upper end of a reciprocating piston 126 of a typical piston actuator 127 secured in an upright position on a suitable base 128. A rearwardly projecting extension 129 from the enclosure 106 is pivotally coupled by a suitable clevis member 130 slidably mounted along the upper end of a generally upright rod 131 having its lower end pivotally connected, as at 132, on the rear of the base 128. A compression spring 133 is positioned between the underside of the slideable clevis 130 and a suitable shoulder 134 on the upright shaft 131.

Accordingly, it will be appreciated by comparison of the dashed-line and full-line positions of the coating apparatus 100 illustrated in FIG. 4 that when the piston actuator 127 is operated to extend the piston 126, the rotatable axle 112 will be elevated into preferably a generally horizontal position to raise the conduit fitting 113 above the surface of the coating composition 116. Then, when the piston actuator 127 is operated to retract the piston 126 (as shown by the full-line portions of FIG. 4), the enclosure 106 will be tilted downwardly about the horizontal pivotal axis provided by the clevis 130 and the enclosure will tilt forwardly about the shaft 124 until being halted by an adjustable stop thereon (shown generally at 135) cm coming into contact with the forward face of the U-shaped bracket 125.

It will, of course, be appreciated by those skilled in the art that suitable, manual, semiautomatic, or fully or fully automatic control systems (not shown) may be readily devised for controlling the operating sequences and timing of the driving motor 111 as well as the piston actuators 123 and 127 in order to achieve an optimum operational cycle for satisfactorily coating particular articles with various types of coating compositions. Moreover, the degree of immersion of the fitting 113 can be appropriately adjusted by either varying the position of the stop 135 and/or varying the depth of the coating composition 116 from the illustrated depth to still-lower depths as indicated by the dashed lines 136 in FIG. 4.

Turning now to FIGS. 5 and 6, a third embodiment is shown of coating apparatus 200 also arranged in accordance with the principles of the present invention. In general, this new and improved apparatus 200 is comprised of a suitable support having a pair of a laterally spaced upright frames or enclosed compartments 201 and 202 mounted on the opposite sides of a horizontal base 203 of lesser height. Aligned pairs of driving wheels 204—207 are operatively mounted on the opposing sides of the upstanding compartments 201 and 202 in alignment along paralleled horizontal axes 208 and 209 and facing one another in a fashion somewhat similar to the arrangement used for the coating apparatus 10 shown in FIG. 1.

Although separate driving mechanisms such as that illustrated in FIG. 2 could be readily employed for driving the wheels 204—207, to insure the synchronization of the driving wheels a single motor 210 is operatively coupled, as by a chain drive assembly 211, for driving an elongated shaft 212 disposed transversely below the base 203 and journaled to the compartments 201 and 202. Suitable driving sprockets (only one shown at 213) are mounted at opposite ends of the common shaft 212 and coupled by suitable driving belts or chains, as at 214, to sprockets, as at 215 and 216, for simultaneously driving operatively journaled shafts 217—220 respectively carrying the driving wheels 204—207.

In contrast to the previously described coating apparatus 10 or 100, the circular driving wheels 204—207 for the coating apparatus depicted in FIGS. 5 and 6 are eccentrically mounted on their respective shafts 217—220. Thus, as best seen in FIG. 6, as the driving wheels 204 and 205 (as well as the wheels 206 and 207) rotate in the direction of the arrows shown at 221 and 222, the divergent notch, as at 223, defined by the adjacent upper surfaces of the rotating wheels will progressively widen and narrow so as to impart a slowly moving upward and downward motion to the rotating axles 224 and 225 and the conduit coupling 226 operatively carried therebetween. In this manner, the rotating coupling 226 will be slowly moved vertically into and out of a suitable coating composition 227 confined in an upright container 228 mounted on the base 203. It will be recognized, of course, that the degree of vertical movement can be simply modified either by substituting the driving wheels 204—207 for others (not shown) having different diameters and/or different degrees of eccentricity or by varying the angular positions of the driving wheels (as, for example, 204 and 206) in relation to the angular positions of the other two wheels (as at 205 and 207). Moreover, other movements can be imparted to an article being coated by using driving wheels that are either cardiods, ovals, or other such generally symmetrical shapes.

Although the container 228 can be fixed in position so that the surface of the coating composition 227 therein is at a desired elevation in relation to the perigee of the path followed by the coupling 226, it is preferred to mount the container as illustrated on a selectively positionable elevating mechanism 229 such as a horizontal plate 230 mounted above the base 203 on one or more vertically movable piston actuators as at 231. In this manner, by suitable manual, semiautomatic, or fully automatic controls (not shown), the piston actuators 231 can be operated as required to accurately position the container 228 at a selected elevation to maintain the coating composition 227 at a desired level in relation to the bottom of the conduit coupling 226.

In the operation of the coating apparatus 10 depicted in FIGS. 1 and 2, the surfaces of an article, such as the conduit coupling 11, which are to be coated are first prepared as required to achieve a satisfactory final coating. There are, of course, many well-known techniques for preparing the surfaces of metal articles for accepting such coatings as well as for providing effective liquid baths or fluidized beds of various coating compositions. Although the particular techniques may vary somewhat depending upon which composition is to be used, those skilled in the art are fully cognizant of the various ramifications involved to achieve a desired result with a given coating composition.

The axles 28 and 29 which are operatively secured to the opposite ends of the coupling 11 have a combined length sufficient to span the distance between the driving mechanisms 30 and 31. It will, of course, be appreciated that if it is desired to form coaxial sleeves of the coating material on each end of the coupling 11, suitably dimensioned cylindrical forms, as at 53 and 54, can be provided on the inner ends of the axles 28 and 29 for insertion into the ends of the coupling. Moreover, if desired, a plurality of couplings, as at 11, and forms, as at 53 and 54, can be tandemly connected to one another along the axis 32 and the axles 28 and 29 correspondingly shortened.

In any event, once the coupling 11 (or a number of such fittings) is mounted on suitable axial shafts, as at 28 and 29, the entire assemblage 41 is heated in a suitable preheating oven (not shown) for a sufficient period of time to bring the coupling to a desired elevated temperature. The particular temperature that the coupling 11 must attain will, of course, be dependent upon the particular coating composition that is being used. In general, however, the temperature to which the conduit coupling 11 will be heated will be significantly greater than the sintering or melting temperature of the coating composition but still less than any extreme temperatures that would tend to degrade the composition.

In any event, once the assemblage 41 emerges from the preheating oven, the assemblage is either directed by suitable conveyor mechanisms (not shown) or manually positioned across the gap between the driving mechanisms 30 and 31. Then, either by manual, semiautomatic, or automatic operation of the motors 52 and 55 and the piston actuator 18, the assemblage 41 is rotated about the axis 32 as the frame 14 is tilted downwardly so as to bring the lower portion of the conduit coupling 11 at least into contact with the upper surface of the coating composition 13.

As previously mentioned, it has been found that by allowing only the underside of the conduit coupling 11 (as well as the forms 53 and 54 if they are used) to contact the coating composition 13, a slow rotation of the assemblage 41 will progressively deposit a uniformly thick film of the coating material around the circumference of the coupling. To obtain such uniformly thick coatings, the rotational speed of the driving mechanisms 30 and 31 is established so that the initial film of the coating composition 13 adhering to the coupling 11 will be melted (by the heat retained in the coupling) before the coupling has been rotated a full revolution. Thereafter, as the coupling 11 continues to rotate, its circumferential surfaces will be repetitively immersed and then removed from the coating composition 13 just long enough to allow the fluent composition then on the surfaces to melt. In this manner, repetitive reimmersions of the already-melted coating will progressively build the coating to a desired thickness and assure that it has a uniform density.

Where the coating composition 13 is a fluidized bed of pulverulent particles, it will be appreciated that the most actively agitated portion of the bed will be immediately adjacent to its upper surface and that the bed will be progressively more stagnant at greater depths. Thus, by employing the coating apparatus 10 with a fluidized bed as at 12 and 13, the articles, as at 11, that are being coated will be subjected to actively agitated coating particles. Moreover, by rotating the coupling 11 about the horizontal axis 32 just above the surface of the bed 13, the entire length of the coupling (as well as the forms 53 and 54) will be exposed to turbulently moving coating particles. This would not necessarily be the case if the coupling 11 was only being moved vertically into and out of the bed 13. Furthermore, by employing the new and improved apparatus 10, loose particles of the coating composition 13 will not accumulate on the top surfaces of the articles being coated. As a result, superior coatings will be obtained with assurance that they are uniform in density and thickness.

If the coating composition 13 is instead a liquid, such as a vinyl-plastisol, an equally superior coating will also be formed on the coupling 11. In particular, it has been found that the coating apparatus 10 will move the coupling 11 into the coating composition 13 in such a manner that air bubbles will not be entrained in the coating and the final coating will be uniformly thick and dense. Moreover, by continually rotating the coupling 11 about its major axis of symmetry 32, the coating will be at least partially gelled when the assemblage 41 is removed from the coating apparatus 10 so that runs or drips will be precluded.

Irrespective of the type of coating composition used, once the coupling 11 has been rotated for a predetermined number of revolutions, the piston actuator 18 is again operated to restore the frame 14 to its elevated position and the assemblage 41 is removed either manually or by a suitable conveyor mechanism (not shown). Thereafter, if the particular coating composition requires post-heating to obtain a desired quality of coating on the coupling 11, the assemblage 41 may be transported through a suitable post-heating oven (not shown). Once the assemblage 41 has completely cooled, it will, of course, be quite simple to disconnect the axles 28 and 29 and forms 53 and 54 from the coupling 11 for subsequent reuse.

It will, of course, be appreciated that the operation of the new and improved coating apparatus 100 will be substantially similar to that already described for the coating apparatus 10. It should, however, be noted that if the coating composition 116 is a liquid, where an article being coated has a lateral projection (such as the branch connection of the illustrated conduit tee 113) there is a good chance that air bubbles may be trapped against the leading surfaces of the projection and, as a result, may form entrained voids in the coatings over these surfaces. Thus, in such instances, articles having laterally offset projections are best coated in a fluidized bed when the coating apparatus 100 is being employed.

The operation of the new and improved coating apparatus 200 is also similar to the operation of the coating apparatus 10. It will be appreciated, however, that since an article (such as the coupling 226) being coated with the apparatus 200 has only a limited span of vertical travel, if the article is relatively small in diameter more reliable control can be obtained with a liquid composition having a closely controlled depth. On the other hand, articles with relatively large diameters can be readily coated with the apparatus 200 and a fluidized coating composition.

The various disclosed embodiments 10, 100 and 200 of the present invention are, of course, readily adjustable in several respects to permit an optimum coating cycle to be established for any given article. For instance, each of these embodiments 10, 100 and 200 can be quickly adapted to regulate the time that each article carried thereon is immersed in a coating composition, the number and frequency of immersions, the depth of each immersion, and the speed of movement of the article through the coating composition. These adjustments are apparent to one with skill in the art and need no further description.

Those skilled in the art will, of course, appreciate that there are still other operating variables which will determine the effectiveness of any particular coating operation. For example, if two dissimilar parts are preheated in a given oven for the same period of time, these two parts simply cannot be equally coated unless different operating techniques are employed for at least one of these parts. Accordingly, it has been necessary heretofore to either coat only identical or closely similar articles during a given production cycle or else to resort to elaborate control systems and/or special handling techniques if dissimilar articles are to be coated in close succession.

The several embodiments 10, 100 and 200 of the present invention are, however, particularly suited for coating even dissimilar articles during the same production cycle. Referring to FIGS. 1 and 2, for example, it will be appreciated that the peripheral speed of the coupling 11 will be directly related to the ratio of the diameters of the outer ends of the axles 28 and 29 to the diameters of the driving wheels 33, 34, 39 and 40. Accordingly, for a given diameter and rotational speed of the driving wheels 33, 34, 39 and 40, the coupling 11 can be rotated at any one of an infinite number of rotational speeds by simply selecting a given diameter for the outer end portions of the axles 28 and 29. Thus, if experience shows that one style or size of coupling requires a first rotational speed and that another style or size of coupling requires a second rotational speed to achieve a desired uniform coating, with everything else being equal, each of these two dissimilar couplings can be mounted on selected sizes of the axles 28 and 29 and coated in succession without requiring any other changes in the operating cycle. It will be appreciated, therefore, that this significant flexibility will permit even dissimilar articles to be coated in succession during the same production cycle without necessitating a special adjustment to the coating apparatus 10 (or 100 or 200).

Accordingly, it will be appreciated that the several disclosed embodiments of the present invention are particularly adapted for efficiently coating large numbers of symmetrically formed articles. By arranging the disclosed coating apparatus to selectively rotate an article about a major axis of symmetry and accurately position the article so that its exterior surfaces are successively immersed into and pulled out of a coating composition, a coating will be progressively built up on the article to provide a final coating that is uniform in thickness and density.

I claim:

1. Apparatus adapted for coating a body supported by a cylindrical axle and comprising: first and second pairs of rollers respectively spaced along and arranged for rotation about first and second generally horizontal parallel axes, said parallel axes being spaced apart so as to position each pair of said rollers with their upper peripheral surfaces defining an upwardly divergent, generally V-shaped notch adapted for carrying a cylindrical axle therebetween with its longitudinal axis parallel to said first and second parallel axes; first means operatively coupled to said rollers and adapted for selectively raising and lowering their said upper peripheral surfaces in unison so as to move an axle carried by said rollers and a body supported by the axle along a predetermined path between upper and lower positions; second means operatively coupled to at least one of said rollers and adapted for rotatively driving an axle and a body supported on said rollers about said longitudinal axis; and a container adapted to contain a fluent coating composition having its upper surface intersecting said predetermined path of a body supported by an axle carried by said rollers.

2. The apparatus of claim 1 wherein said first means include first and second pairs of shafts respectively coupled to eccentric locations on said first and second pairs of rollers for progressively raising and lowering their said upper and lower peripheral surfaces in unison upon simultaneous rotation of said rollers so that a body supported at an intermediate location on an axle carried between said rollers will be moved along said predetermined path into and out of a fluent coating composition in said container.

3. The apparatus of claim 2 wherein said rollers are substantially circular.

4. The apparatus of claim 1 wherein said first means include a support, means operatively journaling said first and second pairs of rollers on said support, and means operatively coupled to said support for selectively moving said support upwardly and downwardly so as to raise and lower a body supported on an axle carried between said rollers.

5. The apparatus of claim 1 wherein said first means include a support, means operatively journaling said first and second pairs of rollers on said support, a base, means on said base operatively mounting said support for pivotal movement about a third axis parallel to said first and second parallel axes, and means operatively interconnected between said base and said support for selectively tilting said support upwardly and downwardly about said third axis so as to raise and lower a body supported at an intermediate position on an axle carried between said rollers.

6. The apparatus of claim 1 wherein said first means include a support, means operatively journaling said first and second pairs of rollers on said support, a base, means on said base operatively mounting said support for pivotal movement about a third axis transverse to said first and second parallel axes, and means operatively interconnected between said base and said support for selectively tilting said support upwardly and downwardly about said third axis so as to raise and lower a body supported at one end of an axle having its other end carried between said rollers; and further including means adapted for retaining the other end of such an axle on said rollers as said support is tilted upwardly and downwardly.

7. Apparatus adapted for coating a body mounted on coincidentally aligned cylindrical axles projecting outwardly from opposite ends of such a body, said apparatus comprising: first and second driving mechanisms spaced along a selected horizontal axis, each of said driving mechanisms including first and second upright rollers arranged for rotation about first and second axes parallel to and below said selected axis and on opposite sides thereof, a said parallel axes being laterally spaced in relation to the lateral dimensions of said rollers so as to position said rollers with their upper peripheral surfaces defining an upwardly divergent, generally V-shaped notch adapted for carrying one of such cylindrical axles so that a body mounted thereon is between said first and second driving mechanisms; motive means operatively coupled to said first and second driving mechanisms and adapted for selectively rotating at least said first rollers so that a body supported between said first and second driving mechanisms will be rotated about said selected axis; a container adapted to contain a fluent coating composition below a body supported between said first and second driving mechanisms; and means operatively coupled to said first and second driving mechanisms and adapted for selectively raising and lowering said driving mechanisms in unison so as to move a body supported therebetween into and out of a coating composition in said container.

8. Apparatus adapted for coating a body mounted on coincidentally aligned cylindrical axles projecting outwardly from opposite ends of such a body, said apparatus comprising: first and second driving mechanisms spaced along a selected horizontal axis, each of said driving mechanisms including first and second upright rollers arranged for rotation about first and second axes parallel to and below said selected axis and on opposite sides thereof, said parallel axes being laterally spaced in relation to the lateral dimensions of said rollers so as to position said rollers with their upper peripheral surfaces defining an upwardly divergent, generally V-shaped notch adapted for carrying one of such cylindrical axles so that a body mounted thereon is between said first and second driving mechanisms, and first and second shafts coincidentally aligned with said first and second parallel axes and respectively coupled to said first and second rollers at eccentric locations thereon so as to progressively close and widen said V-shaped notch as said rollers are rotated in unison; motive means operatively coupled to said first and second driving mechanisms for selectively rotating said first and second shafts in unison so that a body supported between said first and second driving mechanisms will be selectively rotated about said selected axis and be successively raised and lowered along a predetermined path between upper and lower positions as said V-shaped notches progressively close and widen; and a container adapted to contain a fluent coating composition having its upper surface intersecting said predetermined path of a body supported between said first and second driving mechanisms.

9. The apparatus of claim 8 wherein said rollers are substantially circular.

10. Apparatus adapted for coating a body mounted on one end of a cylindrical axle and comprising: a driving mechanism including a support, first and second pairs of upright rollers respectively spaced along and arranged for rotation about first and second generally horizontal parallel axes, said parallel axes being spaced apart so as to position each pair of said rollers with their upper peripheral surfaces defining an upwardly divergent generally V-shaped notch adapted for carrying the other end of a cylindrical axle therebetween with its longitudinal axis parallel to said first and second parallel axes, and means operatively journaling said rollers on said support; a base; means on said base operatively mounting said support for pivotal movement about a third axis parallel to said first and second parallel axes; means operatively interconnected between said base and said support for selectively tilting said support upwardly and downwardly about said third axis so as to raise and lower a body supported on one end of an axle having its other end carried between said rollers; a container having an open top and adapted for containing a fluent coating composition, said container being positioned so as to be below a body mounted on one end of such a cylindrical axle carried by said rollers; and means adapted for retaining the other end of such a cylindrical axle in position on said rollers as a body carried thereby is being moved into and out of a coating composition in said container.

11. Apparatus adapted for coating bodies having major axes of symmetry and comprising: first and second pairs of rollers respectively spaced along and arranged for rotation about first and second generally horizontal parallel axes, said parallel axes being spaced apart so as to position each pair of said rollers with their upper peripheral surfaces defining upwardly divergent, generally V-shaped notches aligned with one another along a selected axis parallel to said first and second parallel axes; first means operatively coupled to said rollers and adapted for rotatively driving said rollers in unison at a uniform peripheral speed; an elongated axle coincidentally aligned with said selected axis and having first and second longitudinally spaced cylindrical portions respectively adapted for reception in said V-shaped notches defined by said first and second pairs of rollers and tangentially engaged by their said upper peripheral surfaces and a third portion adapted for carrying a body with its major axis of symmetry coincidentally aligned with said selected axis, said first and second axle portions having a selected diameter adapted to rotate said axle at a peripheral speed having a selected ratio in relation to said uniform peripheral speed of said rollers; second means operatively coupled to said rollers and adapted for selectively raising and lowering their said upper peripheral surfaces in unison so as to move said axle and a body supported thereon along a predetermined path between upper and lower positions; and container adapted to contain a fluent coating composition having its upper surface intersecting said predetermined path of a body supported on said axle.

12. The apparatus of claim 11 further including: a second elongated axle similar to said first-mentioned axle but having a third portion adapted for carrying a second body dissimilar from a body on said first-mentioned axle and first and second cylindrical portions of a different diameter so as to be rotated at a different peripheral speed by said rollers when said second axle is substituted for said first-mentioned axle.